(12) United States Patent
Snyder (10) Patent No.: US 10,480,413 B2
(45) Date of Patent: Nov. 19, 2019

(54) INERTIAL PARTICLE SEPARATOR FLOW AND PARTICLE BOUNCE CONTROL

(71) Applicant: Rolls-Royce North American Technologies, Inc., Indianapolis, IN (US)

(72) Inventor: Philip H. Snyder, Avon, IN (US)

(73) Assignee: Rolls-Royce North American Technologies, Inc., Indianapolis, IN (US)

(*) Notice: Subject to any disclaimer, the term of this patent is extended or adjusted under 35 U.S.C. 154(b) by 814 days.

(21) Appl. No.: 15/065,106

(22) Filed: Mar. 9, 2016

(65) Prior Publication Data

US 2016/0265434 A1     Sep. 15, 2016

Related U.S. Application Data

(60) Provisional application No. 62/130,723, filed on Mar. 10, 2015.

(51) Int. Cl.
| | |
|---|---|
| *F02C 7/052* | (2006.01) |
| *F02C 7/05* | (2006.01) |
| *F02C 3/04* | (2006.01) |
| *B64D 33/02* | (2006.01) |

(52) U.S. Cl.
CPC ............. *F02C 7/05* (2013.01); *B64D 33/02* (2013.01); *F02C 3/04* (2013.01); *F02C 7/052* (2013.01); *B64D 2033/0246* (2013.01); *F05D 2210/30* (2013.01); *F05D 2220/32* (2013.01); *F05D 2250/61* (2013.01); *F05D 2250/611* (2013.01)

(58) Field of Classification Search
CPC ... F02C 7/05; F02C 7/052; F02C 3/04; B64D 2033/0246; B64D 33/02
See application file for complete search history.

(56) References Cited

U.S. PATENT DOCUMENTS

| | | |
|---|---|---|
| 2,534,138 A | 12/1950 | Marshall |
| 2,935,158 A | 5/1960 | Braun |
| 3,319,402 A | 5/1967 | Ritchie |
| 3,329,377 A | 7/1967 | Peterson et al. |
| 3,702,049 A | 11/1972 | Morris, Jr. |
| 3,998,048 A | 12/1976 | Derue |
| 4,265,646 A | 5/1981 | Weinstein et al. |
| 4,389,227 A | 6/1983 | Hobbs |
| 5,339,622 A | 8/1994 | Bardey et al. |

(Continued)

OTHER PUBLICATIONS

European Search Report dated Jul. 19, 2016 in European Application No. 16159222.5.

*Primary Examiner* — Woody A Lee, Jr.
*Assistant Examiner* — Sabbir Hasan
(74) *Attorney, Agent, or Firm* — Fishman Stewart PLLC (57) ABSTRACT

An intertial particle seperator (IPS) including an intake air duct, a scavenge duct that shares an interior common wall with the intake air duct, a clean air duct, and a splitter. The splitter is configured to split a flow of intake air into a flow of scavenge air to pass through the scavenge duct and a flow of clean air to pass through the clean air duct. The IPS also includes a plurality of valleys on the intake air duct. The plurality of valleys includes a plurality of troughs and peaks along the interior common wall. In addition, each trough of the plurality of valleys extends along a direction of the flow of intake air.

19 Claims, 4 Drawing Sheets

(56) References Cited

U.S. PATENT DOCUMENTS

| | | |
|---|---|---|
| 7,678,165 B2 | 3/2010 | Tingle et al. |
| 8,163,050 B2 | 4/2012 | Belyew |
| 8,945,254 B2 * | 2/2015 | Mayer .................... F02C 7/052 55/306 |
| 2013/0160411 A1 | 6/2013 | Mayer et al. |

* cited by examiner

INERTIAL PARTICLE SEPARATOR FLOW AND PARTICLE BOUNCE CONTROL

CROSS-REFERENCE TO RELATED APPLICATIONS

This application claims priority to U.S. Provisional Patent Application No. 62/130,723 filed on Mar. 10, 2015, the contents of which are hereby incorporated by reference in its entirety.

FIELD OF TECHNOLOGY

An improved particle separator is disclosed. Although the improvements are applicable to particle separators associated with turbines used for propulsive power in marine, land, air, and underwater applications, as examples, the improvements are also applicable to particle separators in general.

BACKGROUND

It has become increasingly desirable to improve the overall system, design, and operation of particle separators in many applications. In one example, a particle separator system may be coupled to a typical gas turbine engine. In such an application, the particle separator serves to minimize the quantity of particulates that enter the gas turbine engine. As such, engine operation may be improved and/or engine wear may be minimized. An inefficient or ineffective particle separator, however, can lead to increased engine wear, downtime and increased pressure drops on the compressor inlet side.

Accordingly, there is room for further improvements in this area.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

A particle separator may be used in various applications and environments where it is helpful to separate undesirable materials from entering an intake of an engine or other device. One example could be to provide an improved inertial particle separator system that has flow and particle bounce control aspects of the system. An air inlet flow path may be provided that has inner and outer walls and in one of the walls grooves may be located upstream of and extending within a scavenged flow path. The grooves may have different geometric configurations, including depths, so as to provide an influence on the particles as they traverse the flow path. The grooves may operate to take chaotic flow and transpose same into a less dynamic or more regular flow. The grooves may operate to reduce the cross sectional area available to the flow in the region adjacent to the wall and cause the flow to be less dynamic or more regular.

Figure 1:
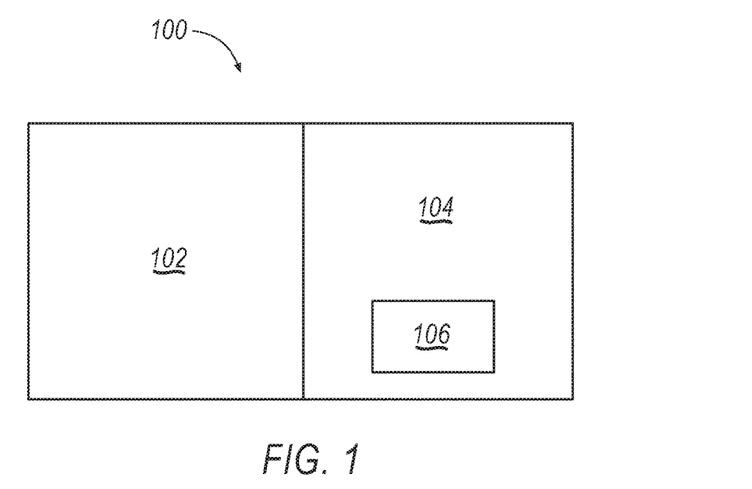
FIG. 1 is a block diagram of a turbine engine system having a particle separator according to an embodiment.

FIG. 1 illustrates block diagram of a turbine engine system 100, which includes an exemplary inertial particle separator (IPS) 102 coupled to a turbine engine 104. The turbine engine 104 includes at least one compressor 106. As will be illustrated below with respect to FIGS. 2A-B, a flow of bulk air (i.e., a bulk airstream) travels into the IPS 102 where it is at least split into a flow of scavenge air (i.e., a scavenge airstream) and a flow of clean air. The flow of clean air is then conveyed to the compressor 106 of the turbine engine 104. As such, the flow of clean air may be considered an engine airstream.

The IPS 102 is configured to separate at least some of particulates from the flow of bulk air such that the particulates are conveyed away from the compressor 106 with the flow of scavenge air. As such, the flow of clean air generally includes less particulates than the flow of bulk air and the flow of scavenge air.

Though not limiting, particulates may include such things as dirt, dust, sand, foreign objects, and/or liquid.

Figure 2A:
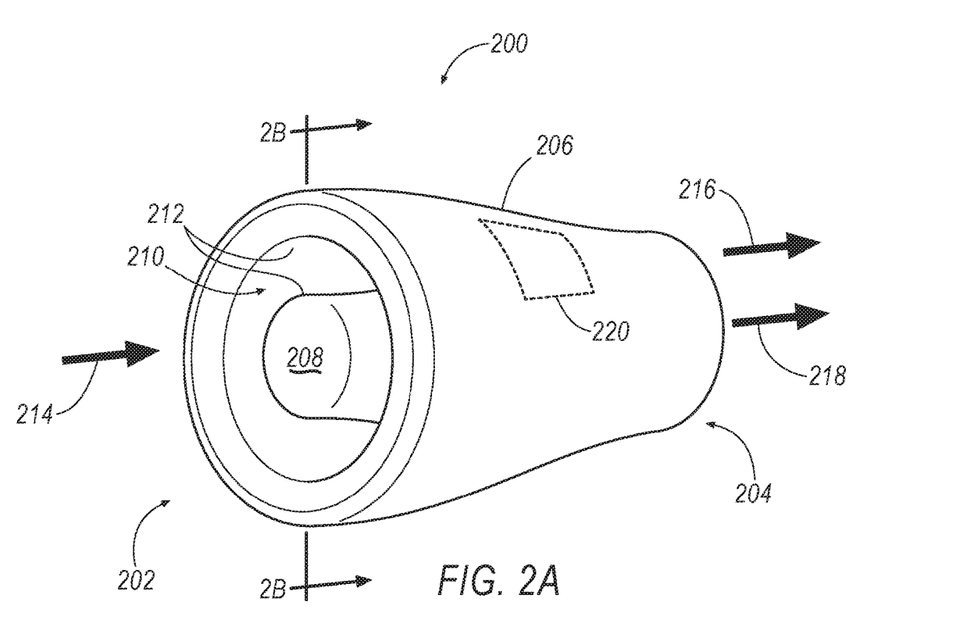
FIG. 2A illustrates an exemplary particle separator according to an embodiment.

Referring now to FIG. 2A, an exemplary annular IPS 200 is illustrated according to an embodiment. The IPS 200, having a front side 202 and a rear side 204 opposite the front side 202, includes an outer shroud 206, a hub 208, at least one bulk air inlet 210, and at least one bulk air duct 212 (i.e., an intake air duct). The IPS 200 is configured to allow a flow of bulk or intake air 214 to enter the bulk air duct 212 via the bulk air inlet 210. The IPS 200 then separates particulates from the flow of bulk air 214 and in so doing divides or splits the flow of bulk air 214 into at least one stream or flow of scavenge air 216 and at least one stream or flow of clean air 218 that are each expelled from the IPS 200. As will be appreciated, the particulates removed from the flow of bulk air 214 are conveyed to the flow of scavenge air 216.

Though the IPS 200 depicted in FIG. 2A is generally cylindrical in shape, the IPS 200 may instead take on other shapes. In addition, though FIG. 2A illustrates the flow of scavenge air 216 and the flow of clean air 218 exiting the rear side 204 of the IPS 200, other embodiments are contemplated where either the flow of scavenge air 216 and/or the flow of clean air 218 exit the IPS 200 in an area other than that shown. For example, the flow of scavenge air 216 may instead, or in addition, exit a scavenge outlet 220 (shown in phantom) on the outer shroud 206.

The IPS 200 depicted in FIG. 2A is merely exemplary, and other IPS embodiments are envisioned that remove particulates from a flow of bulk air and convey those particulates to the scavenge air while leaving the flow of clean air generally cleaner than the flow of bulk air.

Embodiments of the IPS 200 may be utilized in a variety of environments where it is a benefit to remove particulates from a flow of bulk air. For example, the IPS 200 may be coupled to a motor for a vacuum or, as illustrated in FIG. 1, may be coupled to a turbine engine 104.

Figure 2B:
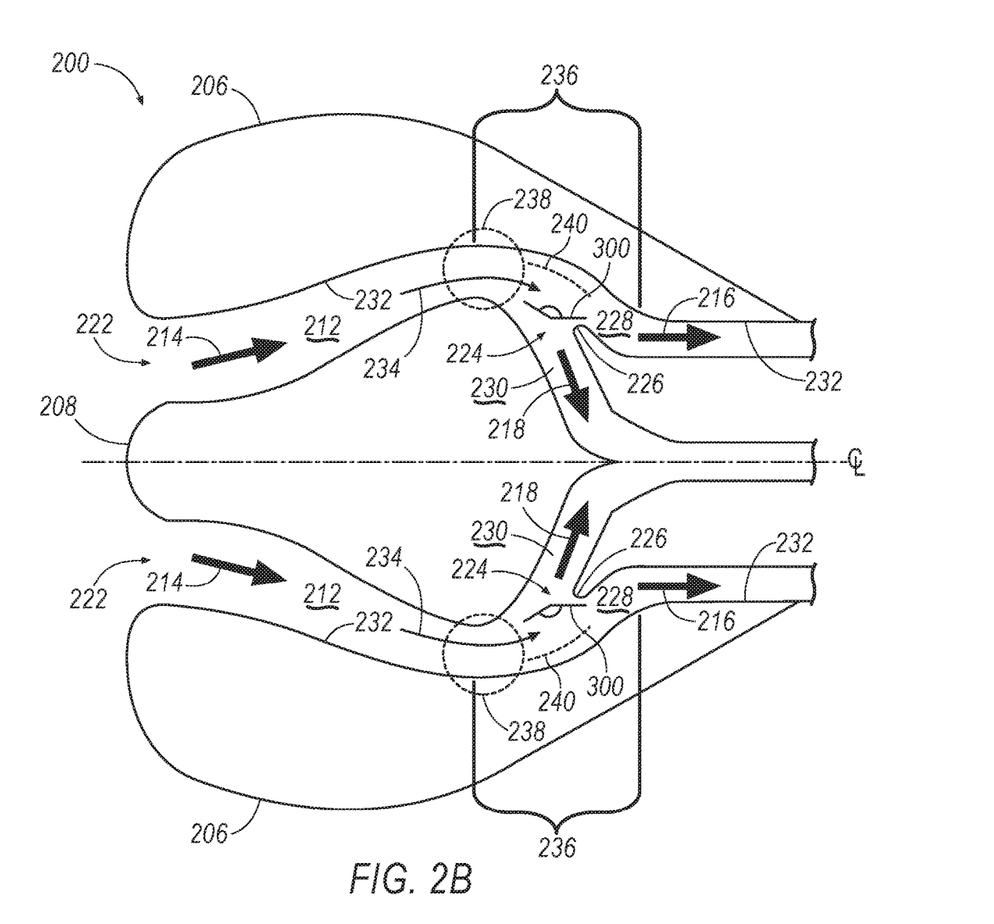
FIG. 2B is a cross-sectional view along 2B-2B of FIG. 2A according to an embodiment.

With reference now to FIG. 2B, an exemplary cross-sectional view of the IPS 200 along line 2B-2B of FIG. 2A is illustrated. The IPS 200 includes the bulk air duct 212 (i.e., an intake air duct) having a first end 222 and a second end 224 downstrem the first end 222. The IPS 200 also includes a splitter 226, a scavenge duct 228 proximate the splitter 226, a clean air duct 230 also proximate the splitter 226, the outer shroud 206, and the hub 208. A flow of bulk air 214 (i.e., intake air) enters the bulk air duct 212 and is separated into the flow of clean air 218 that enters the clean air duct 230 to and the flow of scavenge air 216 that enters the scavenge duct 228. Together, the splitter 226 (a.k.a. a splitter nose) along with the bulk air duct 212 adjoined to the scavenge duct 228 and the clean air duct 230 form an airflow system. The airflow system may be manufactured (e.g., formed or created) as a single piece or as one or more pieces or components coupled together.

Inertia and bouncing impact separates particulates from the flow of bulk air 214 so that the particulates may be passed along with the flow of scavenge air 216 through the scavenge duct 228. If the IPS 200 is coupled to a turbine engine (e.g., turbine engine 104 of FIG. 1), the scavenge duct 228 of FIG. 2B can be employed to convey particulates away from the turbine engine and therefore away from one or more compressors (e.g., compressor 106 of FIG. 1) of the turbine engine. Further, the flow of clean air 218 may be directed to one or more compressors of such a turbine engine.

Though the IPS 200 depicted in FIG. 2B includes only one bulk air duct 212, splitter 226, scavenge duct 228, and clean air duct 230, it is contemplated that the IPS 200 may include a plurality of bulk air ducts, splitters, scavenge ducts, and/or compressor ducts (each not shown). Further, though the IPS 200 depicted in FIG. 2B has an annulus configuration, it will be appreciated that at least portions of the IPS 200 may be segmented. For example, the bulk air duct 212, scavenge duct 228, clean air duct 230, and/or splitter 226 may be segmented (i.e., span less than 360°). Furthermore the bulk air duct 212, scavenge duct 228, clean air duct 230, and/or splitter 226 may be linear and non-annular in shape.

With continued reference to FIG. 2B, the bulk air duct 212 and the scavenge duct 228 of the IPS 200 share an interior common wall 232. As will be set forth in further detail below with respect to FIGS. 3-4C, at least a portion of the common wall 232 of FIG. 2B includes a plurality of hills and furrows or valleys (not shown), which are generally aligned with a bulk flow direction 234 of the flow of bulk air 214. The plurality of valleys may be either coupled to, or integral with, the common wall 232. Further, the plurality of valleys may be positioned along the interior common wall 232 within a valley region 236. It is contemplated that the valley region 236 encompass a region where the velocity of the flow of bulk air 214 is at a minimum or near minimum level. A region of max/near-max bulk flow velocity 238 is hence upstream of the valley region 236. The portion of the flow bulk airstream 214 adjacent to the valley region 236 slows as it splits into the portion of the flow of scavenge air 216 entering the scavenge duct 228. This slowing results in separated flow (a.k.a. boundary layer separation or recirculation), transient flow, turbulence, and dynamic flow.

As will be described below, features of the plurality of hills and valleys help to reduce the magnitude of the transient nature of flow in a separated flow region 240 found adjacent to the common wall 232. These features also cause the particles to bounce away from the clean air duct 224, thus avoiding entrance into the clean airflow stream 218. As such, the particulates enter the scavenge duct 228 and are carried by scavenge airflow stream 216. The separated flow region 240 is a region of air disturbances along the common wall 232 caused by friction between the flow of bulk air 214 and the common wall 232 as the flow slows in entering the scavenge duct 228.

Figure 3:
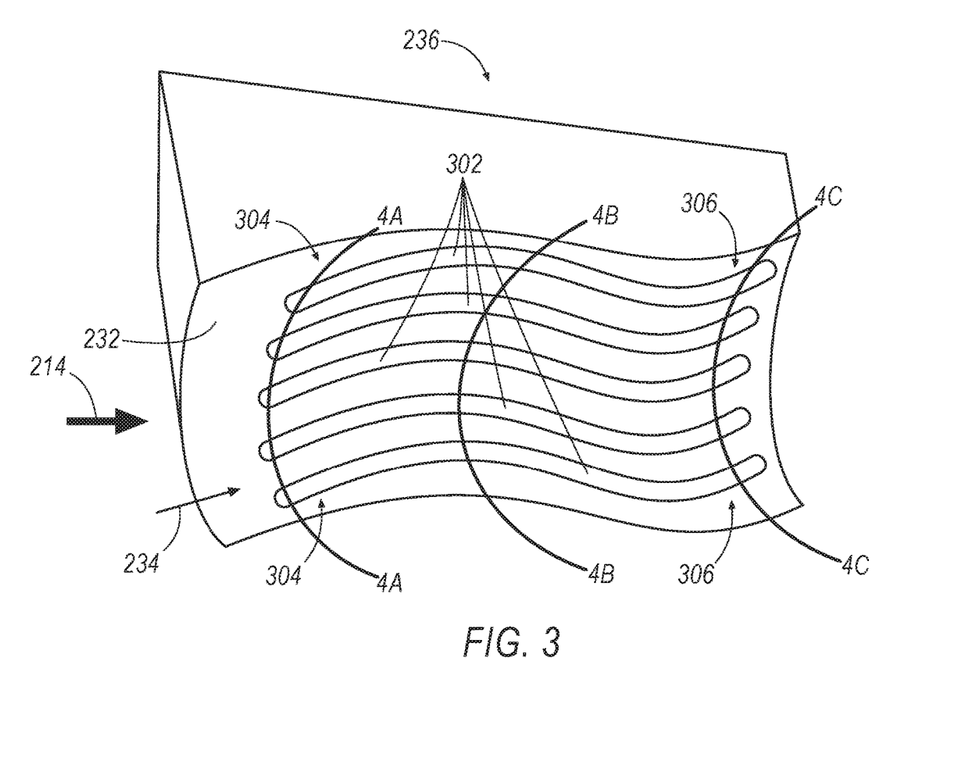
FIG. 3 is a perspective view of a plurality of valleys on the common wall of FIG. 2B according to an embodiment.

Now referring to FIG. 3, a sectional view of the exemplary peak and valley region 236 of the common wall 232 is illustrated from a perspective 300 of FIG. 2B. As illustrated in FIG. 3, the face of the common wall 232 includes an exemplary plurality of valleys or grooves 302 substantially aligned with the bulk flow direction 234. The plurality of grooves 302 has a first end 304 and a second end 306 downstream the first end 304. Though FIG. 3 depicts five valleys, the plurality of valleys may be any number of valleys greater than two valleys. As will be more clearly set forth in FIGS. 4A-4C, the plurality of grooves or valleys 302 are coupled together by a plurality of hills.

With continued reference to FIG. 3, it is noted that embodiments of the plurality of grooves 302 are envisioned having contours different than the contours depicted in FIG. 3. In addition, these alternate contours need not mimic the surface geometry of the common wall 232. Moreover, as will be set forth in greater detail with respect to FIGS. 4A-4C, the grooves 302 that are shown in FIG. 3 have a progression where the depth of the grooves advances as they traverse from fore to aft of the engine system 100. In other words, the depth of the grooves 302 start off shallow at the first end 304 (e.g., section cut 4A-4A) and progress to be deeper towards second end 306 (e.g., section cut 4C-4C). As such, groove depths at section 4B-4B are greater than groove depths at section 4A-4A, while groove depths are greatest at section 4C-4C. According to at least one embodiment, the grooves 302 then end by returning to shallow. It will be appreciated that the length, depth, and shape of each groove may be different than what is depicted. For example, the grooves could have a continuous constant depth, or they could start out deep at section 4A-4A, and progress to a more shallow state at section 4C-4C. Further, according to another embodiment, the grooves may be wider and with contours less steep. These are non-limiting variants of the configurations the grooves may encompass.

Figure 4A:
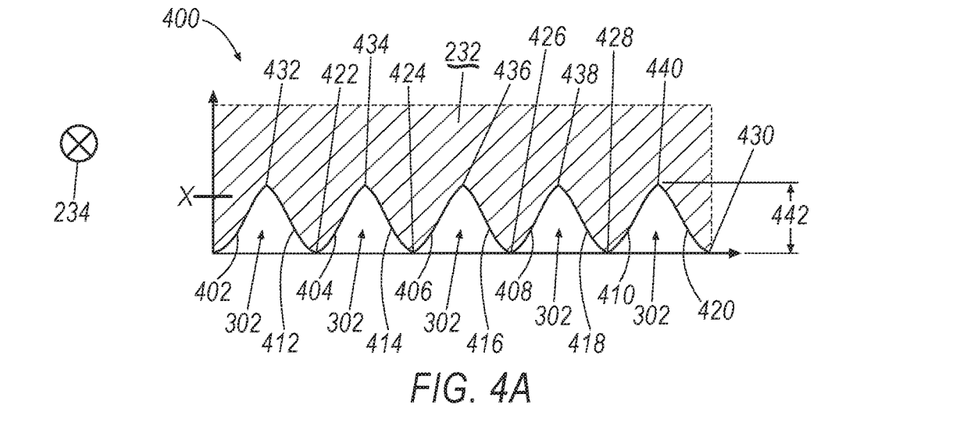
FIG. 4A is a cross-sectional view of the profile of the plurality of valleys taken along line 4A-4A of FIG. 3 according to an embodiment.

As illustrated in FIG. 4, the plurality of grooves 302 is integral with the common wall 232 (i.e., created or formed into the interior common wall 232). However, the plurality of grooves 302 may instead be a separate component (not shown) coupled to the common wall 232. Regardless of the method of manufacture employed to create the plurality of valleys 302, the grooves 302 are configured to manipulate particulate velocities (speed and direction) in the flow of bulk air 214 (i.e., the bulk airstream). It is appreciated that velocity has a magnitude and a directional component.

If the IPS is an annulus such as IPS 200, additional pluralities of valleys (not shown) may be positioned or formed along the circumference of the common wall 232. Alternatively, if the IPS is segmented or linear, pluralities of valleys may be positioned or formed in one or more of the plurality of bulk air ducts employed in the segmented or linear IPS.

With reference to FIGS. 2B and 3, the first end 304 of the plurality of grooves 302 may be positioned within the region of max/near-max bulk flow velocity 238 (i.e., the region where the flow of intake air is substantially at a maximum velocity), while the second end 306 may be positioned outside the region of max/near-max bulk flow velocity 238 in a downstream direction in the scavenge duct 228. Other configurations or placements are, however, contemplated. For example, the first end 304 of the plurality of grooves 302 may be positioned outside the region of max/near-max bulk flow velocity 238 in an upstream direction while the second end 306 remains in the scavenge duct 228. As another example of the placement or position of the plurality of valleys 302, the first end 304 of the plurality of grooves 302 may begin outside the region of max/near-max bulk flow velocity 238 in the upstream direction, while the second end 306 is positioned in a bulk flow region adjacent to the scavenge duct 228 (i.e., a region in the bulk air duct 212 adjacent to the scavenge duct 228, but not within the scavenge duct 228).

The plurality of grooves 302 aid in reducing the mass flow rate of the scavenge air 216 needed to reach a preferred level of separation performance. This reduction of mass flow rate may be achieved without causing a pressure loss in the clean air duct 230 or to an engine inlet (not shown) if the clean air duct 230 is coupled thereto.

The plurality of grooves 302 also aid in reducing the magnitude of the transient nature of the flow in the separated flow region 240, thus increasing the efficiceny of the IPS 200.

The plurality of grooves 302 also aid in bouncing or deflecting particulates away from the clean air duct 230 and, as such, the clean airflow stream 218. That is, the plurality of grooves help to direct particulates into the scavenge duct 228 and scavenge airflow stream 216, thus increasing the efficiceny of the IPS 200.

With reference now to FIG. 4A, a cross-sectional view 400 of the profile of plurality of grooves 302 is shown along line 4A-4A depicted in FIG. 3. For clarity, only a portion of the common wall 232 and the corrugated profile of the plurality of grooves 302 are illustrated in FIG. 4A, rather than an entire cross-sectional segment of the common wall 232. As illustrated in FIG. 4A, each valley or furrow of the plurality of grooves 302 includes a first wall 402, 404, 406, 408, 410 and a second wall 412, 414, 416, 418, 420. Also depicted are a plurality of peaks 422, 424, 426, 428, 430 and troughs 432, 434, 436, 438, 440 of the plurality of valleys 302. Together, the walls 404-418 and peaks 422-430 form hills between each trough 432-440 or valley.

Each valley of the plurality of grooves 302 has a first valley depth 442 of "X," where valley depth (e.g., first valley depth 442) is the distance between a valley trough (e.g., trough 432) and a valley peak (e.g., peak 422).

The first and second walls 402-410, 412-420, respectively, of each valley of the plurality of grooves 302 are preferably at a non-zero angle relative to one another and meet at the respective toughs 432, 434, 436, 438 and 440. The sloping nature of the walls 402-420 of the plurality of grooves 302 serve as a particle bounce control mechanism. That is, the walls 402-420 provide, or at least increase, a particulate velocity component transverse to the bulk flow direction 234. As such, the plurality of grooves 302 aid in deflecting bouncing particulates away from the clean air duct 230 (FIG. 2B) and into the scavenge duct 228 (FIG. 2B). In other words, the plurality of grooves 302 illustrated in FIGS. 3-4 improve particulate trajectories within the IPS (e.g., IPS 102 and IPS 200) and in turn improve particle separator efficiency.

The plurality of grooves 302 not only serve as a particulate bounce control mechanism, but also serve as a flow control mechanism. For example, the plurality of grooves 302 manipulate transient flow in the bulk flow direction 234 in such a manner to cause a plurality of vortices to be formed within the separated flow region 240 of FIG. 2B. These vortices converge downstream and into the scavenge duct 228. In turn, the flow in the separated flow region 240 is stabilized with lessor dynamic content resulting in reduced flow particulates entering the clean airflow 218.

The plurality of grooves 302 not only serve as a particulate bounce control mechanism, and as a flow control mechanism, but also act to reduce the flow area within region 240 and hence slows the portion of the bulk airflow 214 entering the scavenge duct 228. This serves to reduce the region of separated flow and the dynamic transient flow created.

Generally, the mass flow rate of scavenge air needs to reach at least a particular level to attain a particular level of separation performance. However, since the plurality of grooves 302 improve particulate separation efficiencies, the mass flow rate of the scavenge air 216 may be reduced and the particular level of separation performance may still be reached.

Figure 4B:
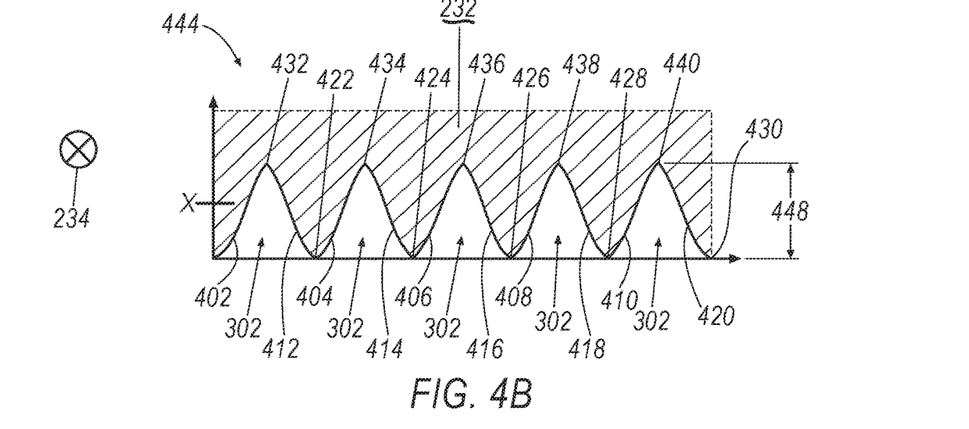
FIG. 4B is a cross-sectional view of the profile of the plurality of valleys taken along line 4B-4B of FIG. 3 according to an embodiment.
Figure 4C:
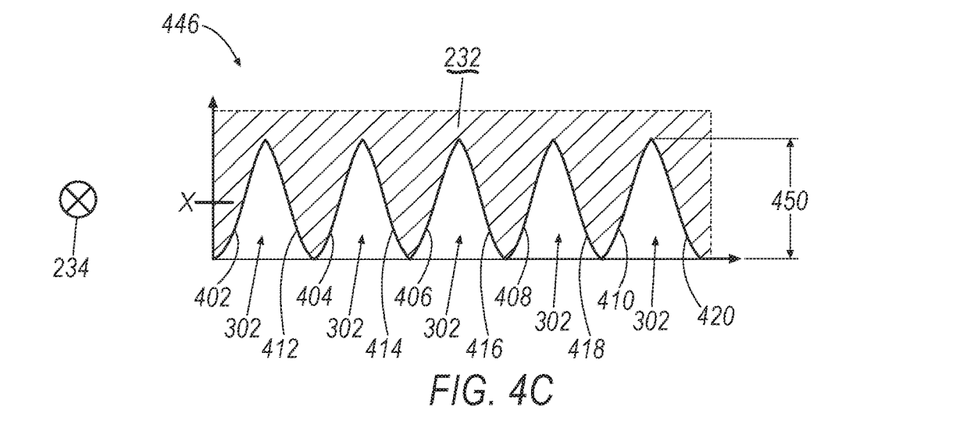
FIG. 4C is a cross-sectional view of the profile of the plurality of valleys taken along line 4C-4C of FIG. 3 according to an embodiment.

Referring now to FIGS. 4B and 4C, a second cross-sectional view 444 along line 4B-4B of FIG. 3 is illustrated in FIG. 4B, while a third cross-sectional view 446 along line 4C-4C of FIG. 3 is illustrated in FIG. 4C. For clarity, only a portion of the cross-section of the common wall 232 is illustrated, rather than an entire cross-sectional segment of the common wall 232.

The second cross-sectional view 444 of FIG. 4B depicts a second valley depth 448 greater than "X" (i.e., first valley depth 442), while the third cross-sectional view 446 of FIG. 4C depicts a third valley depth 450 greater than both first and second valley depth 442, 448, respectively. Accordingly, with Reference to FIGS. 3-4C, the valley depth is generally greatest near the second end 306 of the plurality of grooves 302 and at the shallowest near the first end 304 of the plurality of valleys 302. Accordingly, the depth of the plurality of grooves 302 increases as each valley proceeds from the first end 304 to the second end 306 of FIG. 3.

Though, as illustrated in FIGS. 4A-C, valley depth varies, other configurations are contemplated. For example, though not shown, the valley depth may remain the same from the first end 304 (FIG. 3) to the second end 306 (FIG. 3) or the valley depth may vary in a manner different from that illustrated in FIGS. 4A-C. Further, it is noted that valley depth may vary along each cross section. For example, the valley depth 442 of each groove 302 depicted in FIG. 4A need not be the same. Regardless of whether or not valley depth varies, it is contemplated that valley depths remain less than one inch. However, valley depths may exceed one inch if desired.

The surface feature (i.e., the plurality of grooves or grooves 302 of FIGS. 3-4C) of the IPS 200 of FIGS. 2A-B aid in minimizing the separated flow region 240 (FIG. 2B) at least within the vicinity of the scavenge duct 228 (FIG. 2B). Further, the surface feature reduces the magnitude of the transient nature of the flow in the separated flow region 240. Accordingly, the surface feature beneficially controls flow into the scavenge duct.

Not only does the surface feature control flow, the surface feature improves the bouncing particle trajectories within the airflow and thus improves efficiency of the IPS (e.g., IPS 200). The IPSs having the surface feature discussed herein may be employed with turbine engines or may be employed in other environments where an IPS may be beneficial.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. An intertial particle separator comprising:
    an intake air duct having a first end and a second end downstream the first end, the intake air duct configured to pass a flow of intake air from the first end to the second end;
    a scavenge duct proximate the second end of the intake air duct, wherein the intake air duct and the scavenge duct share an interior common wall;
    a clean air duct proximate the second end of the intake air duct;
    a splitter configured to split the flow of intake air into a flow of scavenge air to pass through the scavenge duct and a flow of clean air to pass through the clean air duct; and
    a plurality of valleys on the intake air duct, the plurality of valleys having a plurality of troughs and peaks along the interior common wall, wherein each trough of the plurality of valleys extends along a direction of the flow of intake air;
    wherein each of the plurality of valleys only increases in height in the direction of flow from a first end of the respective valley to a second end of the respective valley.

2. The intertial particle separator of claim 1, wherein the first end of at least one valley of the plurality of valleys is positioned at a radially outermost point of the intake air duct.

3. The intertial particle separator of claim 1, wherein a valley depth of the at least one valley of the plurality of valleys increases in the direction of the flow of intake air such that the valley depth towards the second end of the valley is greater than the valley depth towards the first end of the valley, and wherein the valley depth is a distance from a trough of the at least one valley to a peak of the at least one valley.

4. The intertial particle separator of claim 3, wherein a valley depth of the at least one valley of the plurality of valleys at the second end of the valley is greater than the valley depth at the first end of the valley.

5. The intertial particle flow separator of claim 1, wherein at least one valley of the plurality of valleys has a first end in the intake air duct and a second end downstream in the intake air duct such that the at least one valley does not enter the scavenge duct.

6. The intertial particle flow separator of claim 1, wherein the clean air duct is configured to pass the flow of clean air into a turbine engine.

7. The intertial particle flow separator of claim 1, wherein each valley of the plurality of valleys has a depth less than one inch.

8. The intertial particle flow separator of claim 1, wherein each valley of the plurality of valleys has a first valley wall and a second valley wall non-parallel to the first valley wall.

9. A gas turbine system comprising:
    a gas turbine having a compressor configured to compress an engine airstream; and
    an inertial particle separator (IPS) configured to separate particulates from a bulk air stream into a scavenge airstream, the IPS comprising:
    a bulk air duct configured to direct flow of the bulk airstream in the IPS;
    a splitter nose configured to split the bulk airstream into the scavenge airstream and the engine airstream;
    a scavenge duct proximate the splitter nose and configured to convey the scavenge airstream having particulates away from the compressor;
    a clean air duct proximate the splitter nose and configured to convey the engine airstream towards the compressor; and
    a plurality of furrows on at least a portion of the bulk air duct, wherein each furrow of the plurality of furrows is oriented along a flow direction of the bulk airstream and is configured to manipulate particulate velocities in the bulk airstream;
    wherein each of the plurality of furrows only increases in height in the flow direction from a first end of the respective furrow to a second end of the respective furrow.

10. The gas turbine system of claim 9, wherein each furrow of the plurality of furrows comprises:
    a first wall extending from a first furrow peak to a furrow trough; and
    a second wall oriented at a non-zero angle relative to the first wall, the second wall extending from a second furrow peak to the furrow trough.

11. The gas turbine system of claim 10, wherein each furrow of the plurality of furrows has a first end in the bulk air duct and a second end downstream the first end, wherein the first end is positioned at a radially outermost point of the bulk air duct.

12. The gas turbine system of claim 11, wherein the first end of at least one furrow of the plurality of furrows is at a first depth and the second end of the at least one furrow is at a second depth greater than the first depth.

13. The gas turbine system of claim 11, wherein the second end of at least one furrow of the plurality of furrows is in the scavenge duct.

14. The gas turbine system of claim 11, wherein the second end of at least one furrow of the plurality of furrows is in the bulk air duct.

15. A method of manufacturing a particle separator comprising:
    forming an air flow system, the air flow system comprising:
    an intake duct having a first end and a second end downstream the first end;
    a scavenge duct adjoined to the second end of the intake duct; and
    a clean air duct adjoined to the second end of the intake duct; and wherein the method further comprises:

creating a plurality of valleys on at least a portion of the intake duct, wherein at least one valley of the plurality of valleys extend downstream the intake duct;

wherein the at least one valley only increases in height in a flow direction of a bulk air flow from a first end of the at least one valley to a second end of the at least one valley, and the at least one valley extends into the scavenge duct such that the second end of the at least one valley is located in the scavenge duct.

16. The method of manufacturing of claim 15, further comprising forming a splitter configured to split the bulk air flow passing through the intake duct into a scavenge air flow that passes through the scavenge duct and a clean air flow that passes through the clean air duct.

17. The method of manufacturing of claim 16, wherein the first end of the at least one valley is opposite the second end of the at least one valley.

18. The method of manufacturing of claim 16, wherein creating the plurality of valleys comprises:

creating a first valley wall for the at least one valley that extends from a first valley peak to a valley trough; and creating a second valley wall for the at least one valley that extends from a second valley peak to the valley trough such that the second valley wall is at a non-zero angle to the first valley wall.

19. The method of manufacturing of claim 16, wherein creating the plurality of valleys on at least a portion of the intake duct comprises:

positioning a first end of the plurality of valleys at a radially outermost point of the intake duct where the bulk air flow is substantially at a maximum velocity; and positioning a second end of the plurality of valleys downstream the first end, wherein at least a portion of the plurality of valleys are integral with the intake duct and coupled to the intake duct.

* * * * *